(12) United States Patent
Breuer

(10) Patent No.: US 9,082,055 B2
(45) Date of Patent: Jul. 14, 2015

(54) METHOD AND COMMUNICATION SYSTEM FOR THE AUTHORIZATION-DEPENDENT CONTROL OF A CONTACTLESS INTERFACE DEVICE

(75) Inventor: Joerg Breuer, Kreuztal (DE)

(73) Assignee: DEUTSCHE TELEKOM AG, Bonn (DE)

( * ) Notice: Subject to any disclaimer, the term of this patent is extended or adjusted under 35 U.S.C. 154(b) by 1041 days.

(21) Appl. No.: 13/121,420

(22) PCT Filed: Sep. 17, 2009

(86) PCT No.: PCT/DE2009/001308
§ 371 (c)(1),
(2), (4) Date: Jun. 10, 2011

(87) PCT Pub. No.: WO2010/037361
PCT Pub. Date: Apr. 8, 2010

(65) Prior Publication Data
US 2011/0231905 A1     Sep. 22, 2011

(30) Foreign Application Priority Data

Sep. 30, 2008  (DE) .................. 10 2008 049 736
Oct. 27, 2008  (DE) .................. 10 2008 053 292

(51) Int. Cl.
*G06F 7/04*       (2006.01)
*G06K 19/073*    (2006.01)
(Continued)

(52) U.S. Cl.
CPC .......... *G06K 19/07318* (2013.01); *G06F 21/78* (2013.01); *G06K 19/07345* (2013.01); *G06K 19/07769* (2013.01)

(58) Field of Classification Search
CPC ..... G06F 21/00; G06F 21/125; G06F 21/126; G06F 21/30; G06F 21/31; G06F 21/32; G06F 21/35; G06F 21/42; G06F 21/43; G06F 21/52; G06F 21/54; G06F 21/60; G06F 21/606; G06F 21/62; G06F 21/629; G06F 21/70; G06F 21/71; G06F 21/74; G06F 21/77; G06F 21/78; G06F 21/81; G06F 21/85; H04W 12/06; H04W 12/08; H04L 63/0245; H04L 63/0254; H04L 63/083; H04L 63/0861; H04L 63/10; H04L 63/20; H04L 41/28
USPC .......... 726/2–3, 11–13, 26–28, 34, 36; 713/1, 713/100, 182–183, 185–186, 193; 340/4, 340/34; 455/410–411, 26.1; 194/239
See application file for complete search history.

(56) References Cited

U.S. PATENT DOCUMENTS 5,257,412 A * 10/1993 Tomioka et al. .............. 455/411
5,553,299 A *  9/1996 McPherson .............. 340/815.41
(Continued)

FOREIGN PATENT DOCUMENTS

DE   102006020683 A1   2/2007
DE   102005062131 A1   7/2007
WO   WO 2007044144 A2  4/2007

OTHER PUBLICATIONS

Search Report for International Application No. PCT/DE09/01308, mailed on Feb. 19, 2010.

*Primary Examiner* — Saleh Najjar
*Assistant Examiner* — Eric W Shepperd
(74) *Attorney, Agent, or Firm* — Leydig, Voit & Mayer, Ltd.

(57) ABSTRACT

A method for the authorization-dependent control of a contactless interface device of a communication device includes authenticating a user to the communication device. The contactless interface device is then deactivated so as to prevent a data transmission via the contactless interface device.

6 Claims, 1 Drawing Sheet

(51) Int. Cl.
  *G06F 21/78* (2013.01)
  *G06K 19/077* (2006.01)

(56) References Cited

U.S. PATENT DOCUMENTS

| | | | |
|---|---|---|---|
| 5,825,697 A * | 10/1998 | Gilliam et al. | 365/200 |
| 5,875,450 A * | 2/1999 | Reiner et al. | 711/104 |
| 5,943,624 A * | 8/1999 | Fox et al. | 455/556.1 |
| 6,045,043 A * | 4/2000 | Bashan et al. | 235/441 |
| 6,161,762 A * | 12/2000 | Bashan et al. | 235/492 |
| 6,792,536 B1 * | 9/2004 | Teppler | 713/178 |
| 6,839,772 B1 * | 1/2005 | Kowalski et al. | 710/5 |
| 6,859,650 B1 * | 2/2005 | Ritter | 455/406 |
| 7,110,792 B2 * | 9/2006 | Rosenberg | 455/558 |
| 7,163,154 B2 * | 1/2007 | Palmade | 235/492 |
| 7,286,818 B2 * | 10/2007 | Rosenberg | 455/414.1 |
| 7,330,714 B2 * | 2/2008 | Rosenberg | 455/412.1 |
| 7,346,718 B2 * | 3/2008 | Sakamura et al. | 710/106 |
| 7,641,111 B2 * | 1/2010 | Adams et al. | 235/380 |
| 8,109,444 B2 * | 2/2012 | Jain | 235/492 |
| 8,331,987 B2 * | 12/2012 | Rosenblatt | 455/556.2 |
| 8,364,139 B2 * | 1/2013 | Rosenblatt | 455/420 |
| 8,369,846 B2 * | 2/2013 | Rosenblatt | 455/420 |
| 8,401,588 B2 * | 3/2013 | Hameed et al. | 455/552.1 |
| 8,442,488 B2 * | 5/2013 | Kawate | 455/410 |
| 2003/0046554 A1 | 3/2003 | Leydier | |
| 2005/0059386 A1 * | 3/2005 | Li | 455/420 |
| 2005/0075135 A1 * | 4/2005 | Cromer et al. | 455/558 |
| 2006/0075124 A1 * | 4/2006 | Dougherty et al. | 709/228 |
| 2006/0113381 A1 | 6/2006 | Hochstein | |
| 2006/0226951 A1 * | 10/2006 | Aull et al. | 340/5.61 |
| 2007/0023503 A1 | 2/2007 | Kang | |
| 2007/0060212 A1 * | 3/2007 | Shah | 455/572 |
| 2007/0075140 A1 | 4/2007 | Guez | |
| 2008/0028230 A1 * | 1/2008 | Shatford | 713/186 |
| 2008/0029608 A1 | 2/2008 | Kellum | |
| 2008/0182556 A1 * | 7/2008 | Kozam | 455/411 |
| 2008/0274694 A1 * | 11/2008 | Castell et al. | 455/26.1 |
| 2009/0065571 A1 * | 3/2009 | Jain | 235/379 |
| 2009/0070272 A1 * | 3/2009 | Jain | 705/75 |
| 2009/0070861 A1 * | 3/2009 | Jain | 726/5 |
| 2009/0199283 A1 * | 8/2009 | Jain | 726/7 |

* cited by examiner

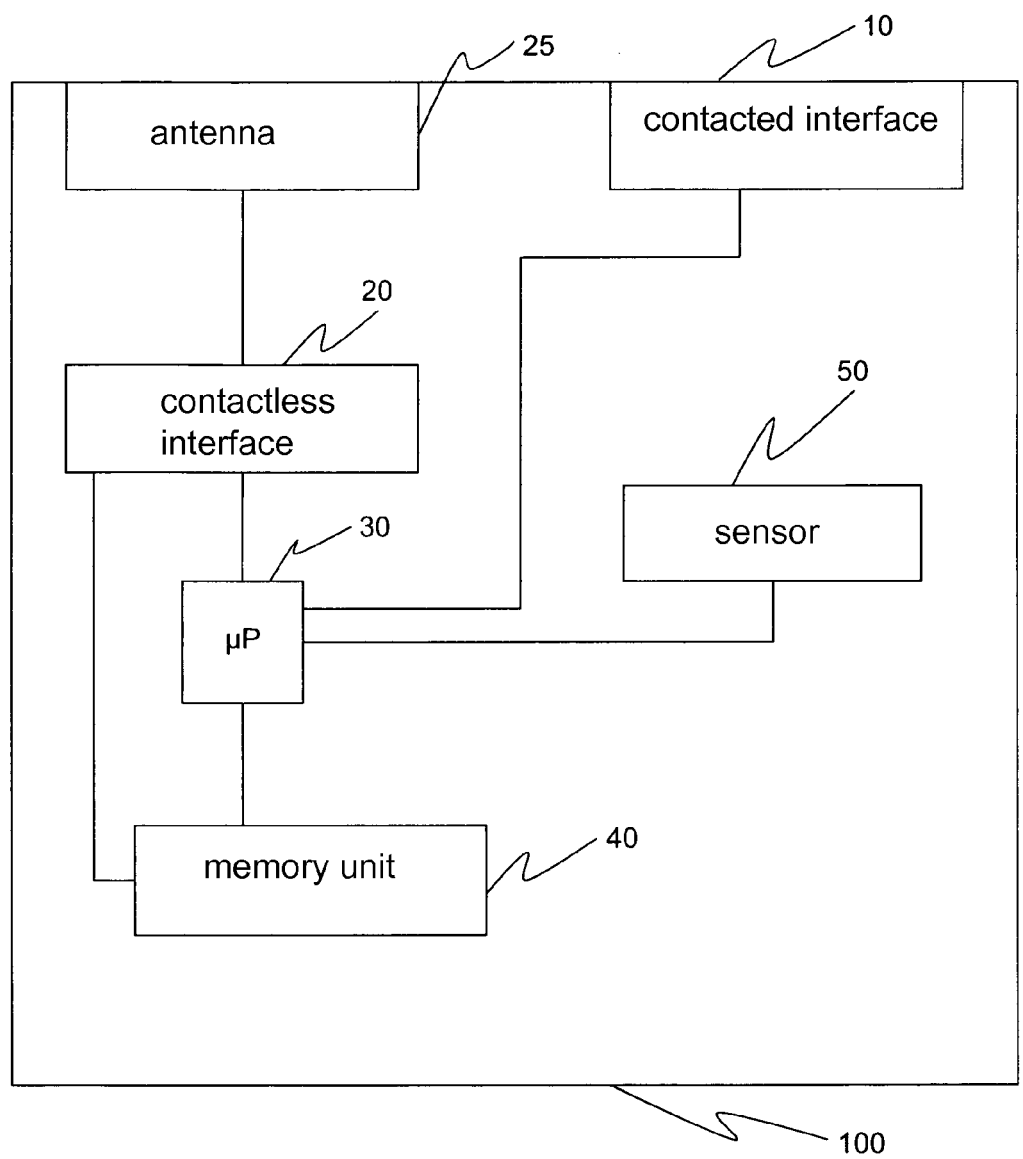

METHOD AND COMMUNICATION SYSTEM FOR THE AUTHORIZATION-DEPENDENT CONTROL OF A CONTACTLESS INTERFACE DEVICE

CROSS-REFERENCE TO PRIOR APPLICATIONS

This application is a U.S. National Phase application under 35 U.S.C. §371 of International Application No. PCT/DE2009/001308, filed on Sep. 17, 2009, and claims benefit to German Patent Application Nos. DE 10 2008 049 736.3, filed on Sep. 30, 2008 and DE 10 2008 053 292.4, filed on Oct. 27, 2008. The International Application was published in German on Apr. 8, 2010 as WO 2010/037361 under PCT Article 21(2).

FIELD

The present invention relates to a method and to a communication system for the authorization-dependent control of a contactless interface device of a communication device such as, for example, a chip card or a mobile communication system.

BACKGROUND

Especially since the introduction of the electronic passport based on a chip card, the discussion about the protection of personal data on electronic identification documents has intensified. Security concerns exist particularly with chip cards having contactless interfaces such as, for example, RFID (Radio Frequency Identification) chips. Here, the risk exists that unauthorized parties always have the possibility to read out data via the contactless interface. The concern that data from electronic devices having contactless interfaces could be read out by unauthorized parties exists not only in the case of citizens' authentication cards, national ID cards, the future personal identification cards, but also in the case of communication systems that are implemented, for example, in vehicles.

SUMMARY

In an embodiment, the present invention provides a method for the authorization-dependent control of a contactless interface device of a communication device. A user is authenticated to the communication device. The contactless interface device is then deactivated so as to prevent a data transmission via the contactless interface device.

BRIEF DESCRIPTION OF THE DRAWING

The present invention will be described in even greater detail below based on the exemplary, schematic figure. The invention is not limited to the exemplary embodiment. Other features and advantages of various embodiments of the present invention will become apparent by reading the following detailed description with reference to the attached drawing which illustrates the following:

FIG. 1 is a schematic diagram of a communication device in accordance with an embodiment of the present invention.

DETAILED DESCRIPTION

In an embodiment, the present invention provides a method and a communication system that increase the data security for the use of communication devices having contactless interfaces.

An aspect of the invention is to undertake a measure with which a user can easily but reliably control access to a communication device via a contactless interface device.

This can be achieved in that a communication device, especially a remotely readable chip card, is prevented from transmitting data via a contactless interface device if an authorized user has intentionally deactivated the contactless interface device by performing a deliberate procedure. Therefore, a sort of "suppressing" functionality is implemented in the communication device, preventing an unwanted automatic reading out of data. On the other hand, the communication device can only transmit data via the contactless interface device if the authorized user has previously intentionally activated the contactless interface device by performing a deliberate procedure.

According to an embodiment of the present invention, a method for the authorization-dependent control of a contactless interface device is put forward. First of all, a user authenticates himself to the communication device, for example, using a conventional authentication method. In order to verify such an authorization, the user can be requested to enter a password into the communication device. After successful authentication, the contactless interface device is deactivated in order to prevent data transmission via the contactless interface device. With this method, an authorization-dependent control of an interface is put forward with which the use of the interface is only made possible if the authorized user has released the interface by means of a deliberate procedure.

The communication device can be an identification medium such as, for example, a chip card with an RFID functionality.

According to an advantageous embodiment, the contactless interface device can be logically deactivated in that the deactivation step starts a filtering function. The activated filtering function ensures that only a command to activate the contactless interface device is accepted. All other commands, for example, the command to read out data from the communication device, are denied.

In the context of the present application, the expression "deactivation of the contactless interface device" can refer to any measure that prevents unauthorized persons from reading out data from the communication device via the contactless interface device, which can also have an antenna.

According to another embodiment, the contactless interface device has an antenna that is deactivated during the deactivation step. For example, an appropriate deactivation signal can actuate a switching device that disconnects the antenna, for instance, from the communication device or from a power supply, so that data can neither be received nor transmitted via the antenna. In this case, a controlled physical disconnection of the contactless interface device can be provided. However, it is also possible to establish or interrupt the connection to the antenna by means of software.

In an embodiment, the appropriate deactivation signal for initiating the filtering function and/or for deactivating the antenna can be provided by the communication device itself or by an external device.

In order to reactivate the deactivated contactless interface device, the user once again authenticates himself to the communication device. Now, an activation signal is provided. In response to the activation signal, the filtering function is deactivated, i.e. switched off, and/or the antenna has been activated.

After a deactivation of the filtering function, commands to read out data from the communication device can once again be processed. In order to activate the antenna, for example, the above-mentioned switching device can once again connect the antenna to the communication device or to the power supply so that data can be received and transmitted.

The activation signal can be generated by the communication device itself as well as by an external device. If the antenna is deactivated, the externally generated activation signal is transmitted to the communication device via a contacted interface device. In this case, the signals needed for the authentication can also be transmitted via the contacted interface device.

The external device can be a detection/reading device that controls the activation and deactivation function. Using this detection/reading device, the user can activate or deactivate the interface, whereby he advantageously has to identify himself to the device. The external device can also be a means that the user carries along with himself. For example, it would be conceivable to switch a microswitch by using a magnet that is placed directly onto the communication device.

If the reading out of data from the communication device is blocked only via the filtering function, the externally provided activation signal can also be received via the contactless interface device of the communication device since the antenna continues to be active.

The authentication step can be based on conventional authentication mechanisms comprising, for example, the evaluation of a password, the evaluation of voice signals and/or the evaluation of biometric data.

According to an embodiment of the present invention, a communication system is created for the authorization-dependent control of a contactless interface device of a communication device. The communication device has a contactless interface device, a device for authenticating a user, and a control device. The control device is configured in such a way that, after successful authentication, it controls the deactivation of the contactless interface device in order to prevent data transmission via the contactless data interface device.

In order to deactivate the contactless interface device, according to an embodiment, the control device can initiate a program that, for example, performs a filtering function that only accepts a command to activate the contactless interface device. All other commands, especially the command to read out data from the communication device, are denied.

If the contactless interface device has an antenna, the deactivation can also be carried out in that the control device controls the deactivation of the antenna.

The communication device can have a contacted interface device for receiving authentication signals and/or an activation command. In this case, the control device can be configured in such a way that, in response to an activation command received via the contacted interface device, it generates a control signal to activate the antenna. Moreover, the control device can be configured in such a way that, in response to an activation command received via the contacted interface device, it supplies a control signal to switch off the filtering function.

Preferably, the communication device is a portable data carrier such as, for example, a chip card.

FIG. 1 shows a communication device 100 that is, for example, an electronic identification card in the form of a dual-interface chip card. The communication device 100 has a memory unit 40 in which personal data can be stored. For purposes of wireless communication, the communication device 100 has a contactless interface device that has a function block designated as a contactless interface 20 as well as an antenna 25. The contactless interface 20 can contain, for example, the communication protocol for wireless data communication and a filtering function, which will be explained below.

Optionally, the communication device 100 can have a contacted interface 10 for contacted data transmission. In order for the user to be able to authenticate himself to the communication device 100, the communication device 100 itself can have means with which a password can be entered, a microphone with which voice signals can be input and/or a biometric sensor 50 with which fingerprints can be identified. The signals needed for the authentication, however, can also be transmitted to the communication device 100 from outside, for example, by means of a terminal (not shown here). The terminal can be configured as a detection/reading device.

The communication device 100 is controlled by a programmable microprocessor 30 that is connected to the described components. If voice signals are entered via a microphone at the communication device, the communication device 100 has a voice analyzer that compares the entered voice signals to stored voice samples. However, it is also conceivable for the authentication to be initiated at a terminal into which the communication device 100 can be inserted. The data needed for the authentication can be transmitted to the communication device 100 either via the contacted interface 10 or via the contactless interface 20.

The mode of operation of the communication device 100 is explained in greater detail, for example, on the basis of an electronic identification card.

The user of the electronic identification card 100 would like to prevent unauthorized persons from being able to read data out of the memory unit 40 via the contactless interface 20 and the antenna 25. For this purpose, the user can utilize a terminal into which the electronic identification card 100 can be inserted. The terminal is configured in such a way that a user can enter the command "deactivation of the contactless interface device". After the command has been entered, the user is prompted by the terminal to prove his authorization. For this purpose, the user can, for example, enter his password on the keyboard of the terminal. The password can be transmitted to the communication device 100 via the contactless interface device 20, 25 or via the contacted interface 10. The microprocessor 30 compares the entered password to a stored password. According to the example of an embodiment, after successful authentication, the microprocessor 30 generates a deactivation signal that deactivates the contactless interface 20 and/or the antenna 25. As an alternative, the microprocessor 30 can also be instructed to generate a deactivation signal via a deactivation command at the terminal.

For example, a program as well as an autonomous operating system can be stored in the communication device 100. In this case, the contactless interface 20 can also be deactivated in that the deactivation signal supplied by the microprocessor 30 initiates a filtering function. The activated filtering function has the task of denying all commands except for the command "activation of the contactless interface". This ensures that, for example, a command "reading out of data" that has been received at the contactless interface 20 is not accepted. It should be pointed out that the filtering function can be a constituent of the contactless interface 20.

In order to deactivate the antenna 25, the deactivation signal supplied by the microprocessor 30 can actuate a switching element such as, for example, a semiconductor switch. The switching element can be arranged between the antenna 25 and the contactless interface 20. It is also conceivable for the antenna 25 to be connected via the switching element to a power supply. If the switching element is opened, either the contactless interface 20 is disconnected from the antenna 25, or else the antenna 25 is disconnected from the power supply. In both cases, data can no longer be transmitted via the contactless interface 20.

Thus, by performing a deliberate procedure, users themselves decide whether and when they will permit access to their electronic identification card 100.

A user can permit access to the communication device 100 via the contactless interface device.

For this purpose, the user can once again go to a terminal into which he inserts the communication device 100. The antenna 25 of the contactless interface device has been deactivated so that the terminal can only communicate with the communication device 100 via the contacted interface 10.

According to an example of an embodiment, the following procedure now takes place:

First of all, the user initiates the procedure "activation of the contactless interface". Then the user is prompted to authenticate himself. For purposes of authentication, the user can, for example, enter a password at the terminal or can have a fingerprint generated by means of a biometric sensor. The data needed for the authentication is subsequently transmitted to the microprocessor 30 via the contacted interface 10. In response to the received authentication data, the microprocessor 30 carries out an authentication procedure. After successful authentication, the user gives the command "activation of the contactless interface". In response to the activation command, the microprocessor 30 generates a control signal that closes the switching element so that the antenna 25 is once again supplied with power. From this time forward, the contactless interface device is activated.

If the filtering function was switched on in addition or as an alternative, the microprocessor 30, in response to the activation command, generates a control signal that switches off the filtering function and thus releases the contactless interface device.

The microprocessor 30 can also actuate the antenna 25 activation and/or switch off the filtering function directly, i.e. without a separate activation command being entered.

If the contactless interface device was not deactivated by means of the antenna 25 but rather only logically via the filtering function, then the command for activation can also be received via the contactless interface device. Subsequently, the command "activation of the contactless interface" is accepted by the filtering function.

In this manner, it is ensured that the communication device 100 can only respond to a reading command if the contactless interface device was first activated by the authorized user by performing a deliberate procedure.

The communication device 100 shown in FIG. 1 could also be used in the automotive sector. Thus, for example, contactless interfaces are being implemented in the CartoCar communication systems currently under development, by means of which the vehicle communicates with various electronic devices. Here, too, the user wants to only release one or more specific interfaces, depending on various situations. Using an authorization-controlled contactless interface of the type used in the communication device 100, the user could ensure, for example, that internal and external communication systems can only communicate with the vehicle if the driver has intentionally permitted this by performing a deliberate procedure. In this manner, the user can, for example, prevent data from being read out and evaluated while the vehicle is being driven.

It should be pointed out that, through such an authorization concept, various users can be granted the authorization to use the contactless interface of a communication device. In embodiments of the described method and the described communication system, the contactless interface of the communication device 100 can only be used if an appropriate authorization for the activation of this interface has been demonstrated. The user has to permit a utilization of the interface through a deliberately performed procedure, namely, by activating the contactless interface. This means that, in the case of an authorization-controlled contactless interface, the communication device 100 only responds if the interface has first been systematically activated by an authorized user through a deliberate procedure. Accordingly, the security of the reading out of the data is considerably improved. Moreover, unauthorized parties are prevented from reading out data from the communication device 100.

Consequently, a suppressing functionality that can be initiated by the user is implemented in the communication device, whereby an activated suppression, that is to say switched-on suppression, blocks the possibility of remote reading out and thus the response function of the communication device.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS

25 antenna
20 contactless interface
30 μP
40 memory unit
10 contacted interface
50 sensor

The invention claimed is:

1. A method for authorization-dependent control of a contactless interface of a portable data carrier with contactless communication capability, the method comprising:

receiving by the portable carrier, first authentication data corresponding to a user of the portable data carrier from an external device via a contact interface of the portable data carrier;

performing, by the portable data carrier, an authentication operation on the first authentication data;

logically deactivating, by the portable data carrier, in response to successful authentication of the first authentication data, the contactless interface of the portable data carrier, wherein the logical deactivation of the contactless interface of the portable data carrier includes:

initiating a filtering function of the portable data carrier, wherein the filtering function includes denial of commands received via the contactless interface, including commands to read out data from the portable data carrier;

after logically deactivating the contactless interface of the portable data carrier, receiving, by the portable data carrier, second authentication data corresponding to the user of the portable data carrier from the external device via the contact interface of the portable data carrier;

performing; by the portable data carrier, an authentication operation on the second authentication data; and logically activating, by the portable data carrier, in response to successful authentication of the second authentication data, the contactless interface of the portable data carrier, wherein the logical activation of the contactless interface of the portable data carrier includes deactivating the filtering function of the portable data carrier, wherein the filtering function is configured to cause the portable data carrier to accept only a command operable to activate the contactless interface.

2. The method according to claim 1, wherein the authentication data comprises at least one of the group consisting of a password, a voice signal and biometric data.

3. The method according to claim 1, wherein the portable data carrier is a chip card.

4. A non-transitory, processor-readable media having processor-executable instructions stored thereon for authorization-dependent control of a contactless interface of a portable data carrier with contactless communication capability, the processor-executable instructions, when executed by a processor, facilitating performance of the following steps:

receiving by the portable carrier, first authentication data corresponding to a user of the portable data carrier from an external device via a contact interface of the portable data carrier;

performing, by the portable data carrier, an authentication operation on the first authentication data;

logically deactivating, by the portable data carrier, in response to successful authentication of the first authentication data, the contactless interface of the portable data carrier, wherein the logical deactivation of the contactless interface of the portable data carrier includes:

initiating a filtering function of the portable data carrier, wherein the filtering function includes denial of commands received via the contactless interface, including commands to read out data from the portable data carrier;

after logically deactivating the contactless interface of the portable data carrier, receiving, by the portable data carrier, second authentication data corresponding to the user of the portable data carrier from the external device via the contact interface of the portable data carrier;

performing; by the portable data carrier, an authentication operation on the second authentication data; and logically activating, by the portable data carrier, in response to successful authentication of the second authentication data, the contactless interface of the portable data carrier, wherein the logical activation of the contactless interface of the portable data carrier includes deactivating the filtering function of the portable data carrier, wherein the filtering function is configured to cause the portable data carrier to accept only a command operable to activate the contactless interface.

5. The non-transitory, processor-readable medium according to claim 4, wherein the authentication data comprises at least one of the group consisting of a password, a voice signal and biometric data.

6. The non-transitory, processor-readable medium according to claim 4, wherein the portable data carrier is a chip card.

* * * * *